United States Patent [19]
Welschof et al.

[11] Patent Number: 4,723,464
[45] Date of Patent: Feb. 9, 1988

[54] DIFFERENTIAL GEAR ASSEMBLY FOR MOTOR VEHICLES

[75] Inventors: Hans-Heinrich Welschof, Rodenbach; Rudolf Beier, Offenbach am Main, both of Fed. Rep. of Germany

[73] Assignee: Löhr & Bromkamp GmbH, Offenbach am Main, Fed. Rep. of Germany

[21] Appl. No.: 757,689

[22] Filed: Jul. 22, 1985

[30] Foreign Application Priority Data

Jul. 26, 1984 [DE] Fed. Rep. of Germany ....... 3427577

[51] Int. Cl.$^4$ .............................................. F16H 1/40
[52] U.S. Cl. ...................................... 74/713; 74/710
[58] Field of Search .................................. 74/710, 713

[56] References Cited

U.S. PATENT DOCUMENTS

| 1,168,245 | 1/1916 | Brush | 74/713 |
| 1,460,064 | 6/1923 | Keck | 74/713 |
| 1,657,091 | 1/1928 | Morgan | 74/713 |
| 2,065,065 | 12/1936 | Ford | 74/713 |
| 2,102,973 | 12/1937 | Porsche | 74/713 |
| 2,187,843 | 1/1940 | Rzeppa | 74/713 |
| 2,546,969 | 4/1951 | Buckendale | 74/713 |
| 4,182,201 | 1/1980 | Mayhew et al. | 74/713 |

FOREIGN PATENT DOCUMENTS 284644 9/1970 Austria .
1213931 11/1970 United Kingdom .

*Primary Examiner*—Leslie Braun
*Assistant Examiner*—Dwight G. Diehl
*Attorney, Agent, or Firm*—Toren, McGeady & Associates

[57] ABSTRACT

A differential gear assembly particularly for motor vehicles having a rotatably supported differential housing, a driving gear attached to the differential housing, at least two rotatably supported differential bevel gears and a pair of output bevel gears which engage into the differential bevel gears with a constant velocity universal joint being integrated into each of the output bevel gears. The differential bevel gears are connected in a form-fitting manner to the driving gear by means of radial and/or axial recesses, apertures or the like, with the differential housing, which may be formed of two parts, being connected to the driving gear. The differential housing is formed with an aperture or is divided in the region of each differential bevel gear to form a compact structure.

1 Claim, 8 Drawing Figures

DIFFERENTIAL GEAR ASSEMBLY FOR MOTOR VEHICLES

The present invention relates generally to a differential gear assembly for a motor vehicle and more particularly to a gear assembly having a rotatably supported differential housing, a driving gear attached to the differential housing, at least two rotatably supported differential bevel gears and a pair of output bevel gears which engage into the differential bevel gears. A constant velocity universal joint may be integrated into each of the output bevel gears.

The general purpose of the differential gear assemblies in motor vehicles is to compensate for different speeds of the driven wheels which may occur for different reasons. Furthermore, the differential gear assembly also operates to distribute the driving torque to the wheels approximately evenly. In conventional differential gear assemblies, the force is transmitted from the driving pinion to the driving wheel and from there through fixing bolts to the differential housing. From the housing, torque is transmitted by means of the differential axles to the differential gear wheels and from there on to two output gears.

Transmitting torque through the housing wall of a differential gear assembly causes the housing to be subjected to torsional loads. Bolts must be dimensioned to suit the torque load and the housing must be of sufficient stiffness in order to insure tooth engagement of the pinion and output gear and of the differential and output gear wheels under all load conditions. These requirements apply to one-part housings and also especially to two-part housings.

Meeting stiffness requirements gives rise to housings of considerable weight. Additionally, the bolts for fixing the driving gear and the differential axle or axles for supporting the differential gear wheels create a weight-increasing effect and, thus, tend to increase the cost of the assembly.

In the prior art, it is known from AT-PS No. 288 644 that, for the purposes of conserving space, the constant velocity universal plunging joints may be integrated into the output gears of the differential gear assembly. Otherwise, the gear assembly will have a generally conventional design, i.e., the differential gear wheels are supported on the housing by differential axles with the two joint spaces being separated from the differential gear assembly interior by walls. These walls as well as the differential axles passing through the differential gear interior prevent the gear assembly from having its dimensions in the axial direction reduced so as to provide a more compact assembly.

Accordingly, the present invention is directed toward providing a differential gear assembly for motor vehicles which is particularly characterized by a considerable reduction in weight and commensurate savings in costs. Particularly, the invention is directed to reducing the load on the housing of the differential gear assembly and on the bolted connection between the differential gear wheel and the housing, thus, permitting a less complicated design.

Furthermore, in the case of the differential gear assembly with integrated constant velocity universal joints, the axial distance of the joints is to be reduced to a minimum in order to achieve a compact design, and, thus, a further reduction in weight with a smaller permanent joint angle.

SUMMARY OF THE INVENTION

Briefly, the present invention may be described as a differential gear assembly for motor vehicles comprising a rotatably supported differential housing, a driving gear attached to the differential housing, at least two rotatably supported differential bevel gears, a pair of output bevel gears which engage said differential bevel gears, a pair of constant velocity universal joints having one of said pair of output bevel gears operatively associated with each, a pair of driven shafts, each connected to be rotated respectively through one of the universal joints and means rotatably mounting the differential bevel gears on the driving gear. The differential housing is formed with an aperture or opening or is divided in the region of each of the differential bevel gears for operatively receiving the bevel gears therein.

With reference to the differential gear assembly, the objectives of the invention are achieved in accordance therewith in that the differential bevel gears are connected in a form-fitting way to the driving gear via radial and/or axial recesses, apertures or the like, with the differential housing or its parts or halves being connected to the driving gear and with the differential housing having an aperture or being divided in the region of each differential bevel gear. On the basis of the inventive concept of the present invention, the torque, through the form-fitting connection, can be transmitted from the driving gear to the differential gear wheels without the differential housing and the bolted connection between the driving gear and the housing participating in this process. The housing only has to accommodate the reaction forces coming from the drive and transmit them to the housing bearings. This means that the housing may be less stiff and thus lighter in weight. Furthermore, it is possible to use smaller and thus cheaper fixing bolts or to do without them altogether. By arranging the driving gear in the axial plane of the differential gear wheels, i.e., in the plane of the differential axles, rotary support and axial support of the differential gear wheels on the driving gear is simplified. This also permits the wall thickness of the differential housing to be reduced as compared to designs where the differential gear wheels are supported at the housing.

In a preferred embodiment of the invention, the radial recesses on the inside of the driving gear wheel are formed as key grooves and the differential gear wheels are rotatably supported in keys by means of a journal formed on their outside, with the keys being arranged in the key grooves. In this way, the differential gear wheels are rotatively supported at the driving gear, while avoiding the housing, and supported to be able to receive the reaction forces. If the keys are worn, they can easily be exchanged after removing the driving gear.

In accordance with a further embodiment of the invention, the radial recesses in the driving gear are radial bores, the outside of each differential gear wheel is provided with an axial bore and pins are inserted into the bores. Torque transmission from the driving gear to the differential gear wheels is thus effected by means of the pins engaging into the differential gear wheel, on the one hand, and into the driving gear on the other hand. In this case, also, a wear disc of bronze, for example, may be arranged between the driving gear and the differential gear wheel. In this embodiment and in the one described hereinafter, the outside of the differential gear wheels may be calotte-shaped and the inside of the driving gear provided with corresponding calotte-shaped turned out sections. The radial reaction forces resulting from the transmission of torque to the output gears are accommodated in the calotte-shaped face of the turned out sections.

In a further embodiment of the invention, the driving gear is designed as a disc and is provided with axial apertures and connected on both sides to parts of the differential housing, with the axial apertures serving to support the differential bevel gears.

In another aspect of this embodiment of the invention, the differential bevel gears are calotte-shaped and rest against a correspondingly designed inside of the differential housing parts. Preferably, the outside and inside of the differential gear wheels have been provided with journals engaging into corresponding parts of the apertures. Where, with the previously described embodiments, torque is transmitted from the driving gear only to the outside of the differential gear wheels, the driving gear extending into the inside of the housing makes it possible to support the differential gear wheels both on the outside and inside, which is advantageous insofar as the service life of the differential and output gears is concerned. The driving gear extends no further into the differential housing than is necessary for the internal support of the differential gear wheels. The differential housing consists of two identical housing parts attached on both sides of the driving gear.

In a further embodiment of the invention, the differential housing is formed of two essentially equally designed housing parts attached on both sides of the driving gear. As the housing no longer participates in transmitting torque, it is possible to design it in such a way that it is cheaper to produce. The two identical housing parts used in this embodiment which, in addition, have an easy geometry from a production-technical point of view, permit a reduction in the production costs. The load on the housing parts, which essentially consist of the axial and radial reaction forces which result from the transmission of torque to the crown wheel, is accommodated by the housing parts and passed on to the bearings. The axial reaction forces resulting from the transmission of torque to the output gears are accommodated in the housing itself by means of the fixing bolts. In this embodiment, also, the outside of the differential gear wheels may have axial journals extending into the keys with the keys being inserted into corresponding key grooves of the driving gear.

In accordance with a further embodiment of the invention, the differential housing is formed to consist of two differently designed housing parts attached on the same side of the driving gear. The driving gear and the two housing parts are preferably held together by the same fixing bolts.

The rotary support and the support of the differential gear wheels on the driving gear, as described in accordance with the invention, not only permits doing without the differential axle or axles, but also generally permits the differential gear wheels to be moved radially outwardly.

In a further embodiment of this concept, each differential gear wheel is preferably partially arranged in its housing aperture. The entire inside of the differential gear is now available for the joints which are integrated into the differential gear. The joints may now converge leaving the smallest possible axial distance between them. On the one hand, this results in a reduction in the operating angle of the constant velocity joint, and, thus, in an increase in the joint service life and it is possible to use smaller and thus more reasonably priced joints.

On the other hand, the axial dimension of the differential gear is reduced and the bearings may be arranged closer together. This in turn results in a reduction in weight of the differential gear assembly.

Furthermore, by partially moving the differential gear wheels into the housing aperture or apertures, there is obtained an increase in the tooth diameter and thus a reduction in the forces acting on the teeth during the transmission of torque. This makes it possible to select smaller teeth which can be produced more cheaply. The part of the differential gear wheel extending into the aperture is preferably held at a distance from the edge of the aperture in the direction of rotation of the differential housing. This insures that the housing does not participate in the transmission of torque from the driving gear to the differential gear wheels. In the case of passenger cars, usually two differential gear wheels are used, but for transmitting higher driving torques, three or four are required. In special cases, the differential gear assembly in accordance with the present invention may have more than four gear wheels.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE PREFERRED EMBODIMENTS

Figure 1:
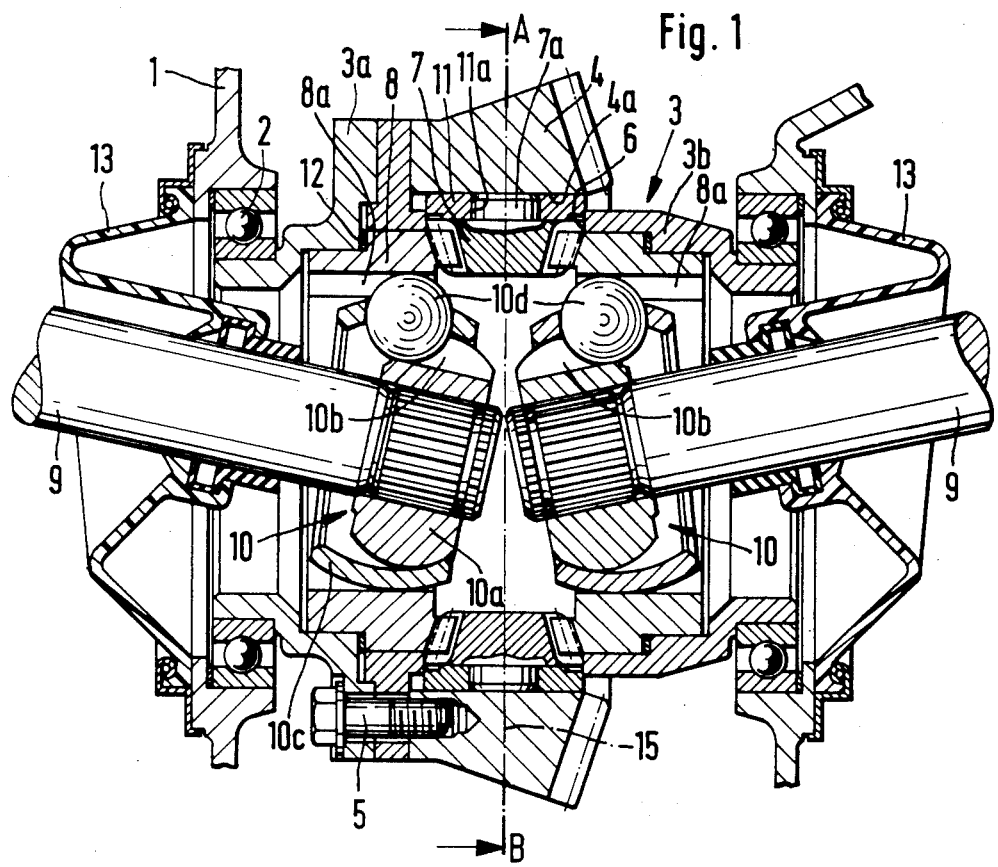
FIG. 1 is a cross-sectional view of a first embodiment of a differential gear assembly in accordance with the present invention having integrated constant velocity universal joints.
Figure 2:
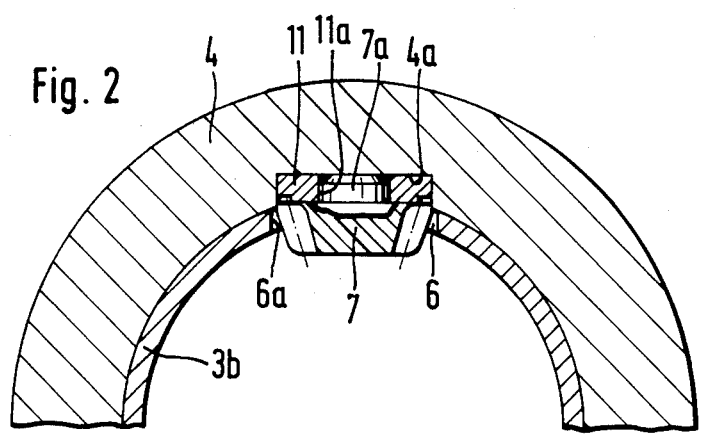
FIG. 2 is a sectional view taken along the line A-B of FIG. 1.

Referring now to the drawings and more particularly to FIGS. 1 and 2, wherein there is depicted a first embodiment of the invention, there is shown a differential gear assembly which comprises a differential housing 3 which is formed with two housing parts 3a and 3b. The housing 3 is rotatably supported in an axle housing 1 by means of deep groove or roller bearings 2. The assembly also includes differential gear wheels 7. The two housing parts 3a, 3b are fixed to a driving gear 4 by means of bolts 5, with the driving gear 4 being fixed in the central plane of the housing 3a, 3b or in the axial plane 15 of the differential gear wheels 7. Housing part 3b is provided with radial apertures 6 and contains the differential bevel gear 7 and output bevel gears 8 are arranged to engage with the bevel gears 7. In the embodiment of FIGS. 1 and 2, axle shafts 9 are supported in the output bevel gears 8 by means of constant velocity universal plunging joints 10.

Each of the constant velocity universal joints 10 comprise an inner joint member 10a wedged onto one of the axle shafts 9, a cage 10c having windows formed therein and balls 10d which are arranged in the windows of the cage 10c and which, on the one hand, are guided in guiding grooves 10b formed in the inner joint member 10a. The output bevel gears 8 act as outer joint members, respectively, of the universal joints 10 and the balls 10b are guided, on the other hand, in grooves 8a of the output gears 8.

The differential gear wheels 7 extend partially into housing apertures 6 with their outer sides being provided with an axial journal 7a. The cylindrical axial journal 7a engages into a cylindrical recess 11a of a key 11 which, as is best seen in FIG. 2, is arranged in a key groove 4a formed on the inner side of the driving gear 4. It will be seen from FIG. 2 that the differential gear wheel 7, in the circumferential direction of the housing part 3b, is maintained at a distance from an edge 6a of the aperture 6, an arrangement which prevents torque from being transmitted from the differential gear wheel 7 to the housing part 3b. The torque is transmitted from the driving gear 4 by means of the key 11 inserted into the key groove 4a to the gear journal 7a and thus to the differential gear wheel 7, with the free rotatability of the differential gear wheel 7 being insured by the journal 7a in the key 11.

The axial reaction forces resulting from the transmission of torque to the output gears 8 are transmitted by the output gears through discs 12 onto the housing parts 3a, 3b. The interior of the differential gear assembly together with the joints 10 is sealed against the exterior by means of boots 13.

Figure 3:
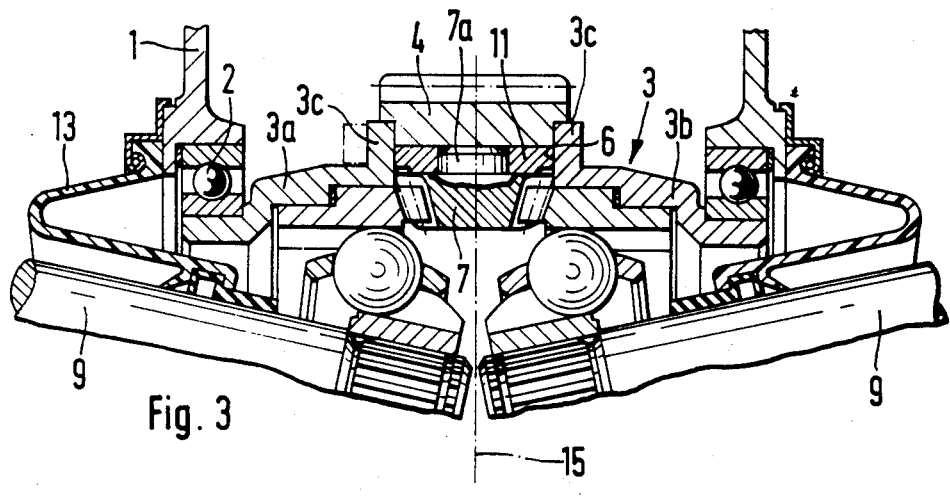
FIG. 3 is a partial sectional view of a second embodiment of the invention.

In FIG. 3, there is shown another embodiment of the invention, wherein the differential housing 3 again consists of identically designed housing parts 3a, 3b, the inside of which has been provided with a short radial flange 3c. The flanges 3c comprise a key groove having the inserted key 11 in an arrangement similar to that depicted in FIG. 2. Outside the key grooves, the driving gear 4 extends radially inwardly by the depth of the key groove. In these regions, the flanges 3c are bolted to the driving gear 4 across the gear circumference (not illustrated). Otherwise, the embodiment of FIG. 3 is generally identical to that shown in FIGS. 1 and 2.

Figure 4:
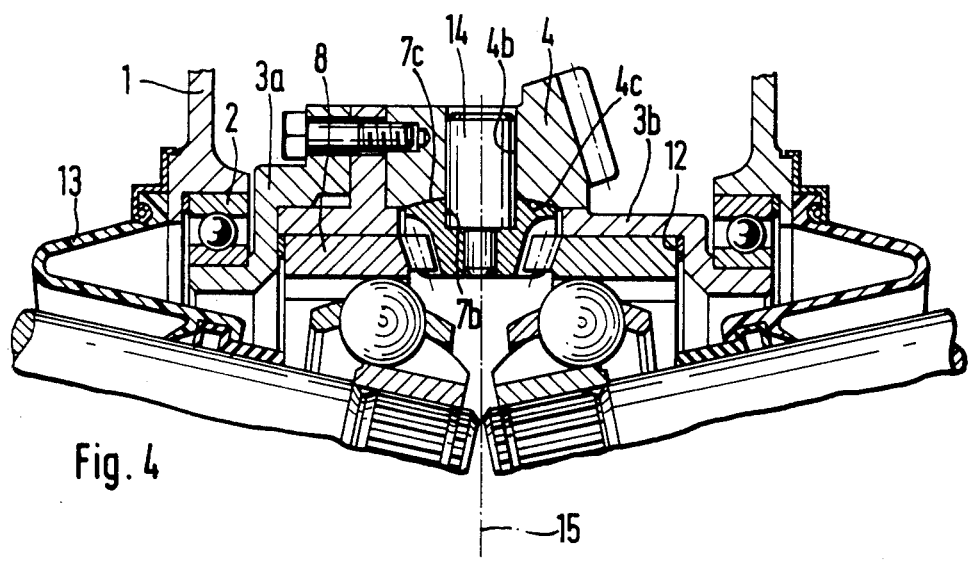
FIG. 4 is a partial sectional view of a third embodiment of the invention.

A further embodiment shown in FIG. 4 differs from those embodiments shown in FIGS. 1-3 essentially with regard to the type of connection which is formed between the driving gear 4 and the differential gear wheels 7. The wheels 7 have a cylindrical bore 7b extending radially inwardly from the outside 7c and the driving gear 4 has been provided with radial cylindrical bores 4b arranged in accordance with the differential gear wheels. The bores 4b, 7b contain a form-fitted cylindrical pin 14 which, on the one hand, insures the transmission of torque from the driving gear 4 to the differential gear wheels 7 and, on the other hand, permits free rotatability of the differential gear wheels 7. The outsides 7c of the differential gear wheels 7 are calotte-shaped and are positioned in corresponding calotte-shaped turned out sections 4c of the driving gear 4. The radial reaction forces, resulting from the transmission of torque from the differential gear wheels 7 to the output gears 8, are transferred by means of the faces 7c, 4c, with possibly a wear ring being inserted onto the driving gear and the axial reaction forces coming from the output gears 8 are transferred through the wear discs 12 onto the housing parts 3a and 3b.

Figure 5:
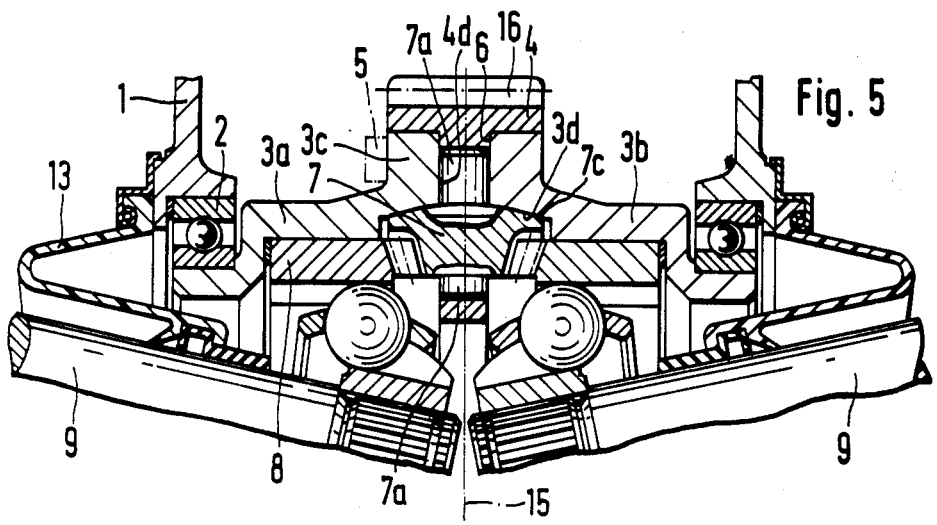
FIG. 5 is a partial sectional view of a fourth embodiment of the invention.
Figure 5A:
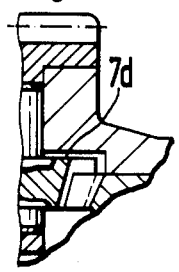
FIG. 5a is a sectional partial illustration analogous to FIG. 5, but with a plane outer face of the differential gear wheel.
Figure 6A:
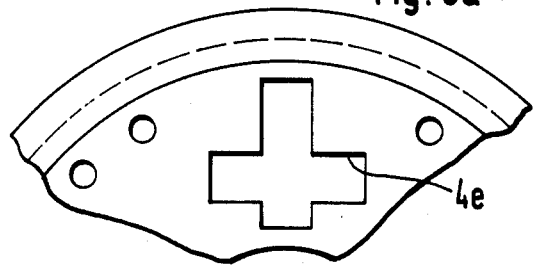
FIG. 6a is a partial illustration in side view analogous to FIG. 6, but with straight edges of the recesses, apertures or the like provided in the driving gear.
Figure 6:
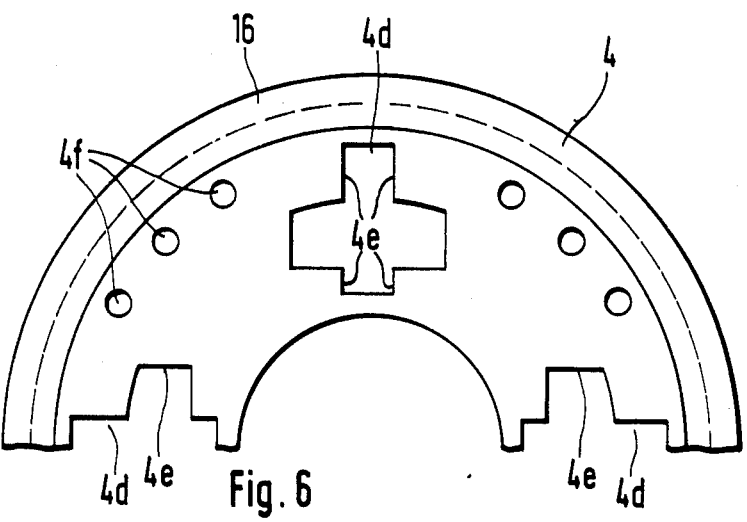
FIG. 6 is a side view of a driving gear used in the embodiment of FIG. 5.

In the embodiments illustrated in FIGS. 5 and 6, the differential housing consists of two identical housing parts 3a, 3b which are connected by bolts 5 to the driving gear 4 therebetween. The driving gear 4 extends through the aperture 6 extending across the entire housing circumference into the interior of the differential housing formed of the parts 3a, 3b. In the driving gear 4, provision is made for four recesses 4d which partially receive the differential gear wheels 7. The differential gear wheels 7, on their inside and outside, have axial cylindrical journals 7a and the recesses 4d of the driving gear 4 have correspondingly formed recess parts 4e into the which the journals 7a engage. As in the case of the embodiment of FIG. 4, the differential gear wheels 7 have a calotte-shaped outside 7c and rest against correspondingly calotte-shaped turned out sections 3d of the housing.

The driving gear has a multitude of bores 4f so as to be capable of being bolted to the housing parts 3a, 3b. Instead of giving the outer faces 7c a calotte-shaped design, it is also possible to provide them with a plane design. In such case, the differential bevel gear is supported in correspondingly designed axial apertures of the driving gear.

It should be noted that the invention is not limited to the specific embodiments illustrated. Particularly, the transmission of torque from the driving gear 4 arranged in the differential plane 15 to the differential gear wheels 7 may also be effected in a different manner, but the transmission of torque via the housing is essentially avoided. However, the advantages of the invention are particularly derived from the fact that the differential gear is provided with integrated joints because then the axial distance between the joint center and thus the operating angle are reduced and, additionally, a particularly compact design may be achieved.

Furthermore, the driving gear may preferably be a driving gear or a gear with end splines.

Thus, it will be seen that the present invention provides a differential gear assembly having a rotatably supported differential housing with an output gear attached to the differential housing and at least two rotatably supported differential bevel gears supported in the housing. Two output bevel gears which engage into the differential bevel gears are each integrated with a constant velocity universal joint. In accordance with the present invention, the differential gear is characterized in that the differential housing formed of the parts 3a, 3b has an opening in the region of each differential bevel gear 7, and the differential bevel gears 7 are connected in a fitted manner with the driving gear 4 through apertures 6 by means of radial and/or axial recesses in the driving gear 4. The differential gear is characterized in that it is of a low weight. If there are provided integrated constant velocity joints, the axial distance between the joint centers is reduced to a minimum so that a reduction in the operating angle may be achieved, as will be evident from FIG. 1.

While specific embodiments of the invention have been shown and described in detail to illustrate the application of the inventive principles, it will be understood that the invention may be embodied otherwise without departing from such principles.

What is claimed is:

1. A differential gear assembly for motor vehicles having integrated universal joints comprising:
    a rotatably supported differential housing;
    a driving gear attached to said differential housing
    at least two rotatably supported differential bevel gears;
    a pair of output bevel gears which engage said differential bevel gears;
    a pair of constant velocity universal joints each including an inner joint member and an outer joint member, with each of said pair of output bevel gears being arranged to form, respectively, the outer joint member of one of said universal joints whereby one each of said outer members and said output bevel gears are formed as a single integral member;
    a pair of driven shafts each connected to one of said inner joint members so as to be rotated, respectively, through one of said universal joints; and
    mounting means rotatably mounting said differential bevel gears on said driving gear, said mounting means including recess means formed on a radially inner side of said driving gear and pin means on said differential bevel gears extending to within said recess means for rotatably mounting said bevel gears on said driving gear at a position generally axially aligned therewith;
    said differential housing having means for operatively receiving said differential bevel gears therein in a manner to permit said universal joints to be arranged in close proximity to each other axially of said differential gear assembly;
    said recess means comprising radial recesses formed in said driving gear as key grooves and wherein said differential bevel gears are rotatably supported in keys by means of a journal formed on the outside thereof, with said keys being arranged in said key grooves.

* * * * *